(12) United States Patent
Mattichak

(10) Patent No.: US 7,388,348 B2
(45) Date of Patent: Jun. 17, 2008

(54) PORTABLE SOLAR ENERGY SYSTEM

(76) Inventor: Alan D. Mattichak, Port Republic, VA (US) 24471

( * ) Notice: Subject to any disclaimer, the term of this patent is extended or adjusted under 35 U.S.C. 154(b) by 447 days.

(21) Appl. No.: 11/181,808

(22) Filed: Jul. 15, 2005

(65) Prior Publication Data

US 2007/0013340 A1   Jan. 18, 2007

(51) Int. Cl.
*H01M 10/44* (2006.01)
*H01M 10/46* (2006.01)
*H02J 7/00* (2006.01)

(52) U.S. Cl. ............... 320/101; 320/145; 320/116; 361/686; 361/601; 307/150; 307/66

(58) Field of Classification Search ............ 320/101, 320/145, 116; 361/686, 601; 307/150, 66; 363/72
See application file for complete search history.

(56) References Cited

U.S. PATENT DOCUMENTS

| | | | |
|---|---|---|---|
| 4,261,329 A | | 4/1981 | Walsh et al. |
| 4,376,250 A | * | 3/1983 | Baker et al. ............ 307/150 |
| 4,860,185 A | * | 8/1989 | Brewer et al. ............ 307/66 |
| 5,111,127 A | * | 5/1992 | Johnson ............... 320/101 |
| 5,522,943 A | | 6/1996 | Spenser et al. |
| 5,708,348 A | * | 1/1998 | Frey et al. ............ 320/145 |
| 5,909,061 A | | 6/1999 | Sasaki et al. |
| 5,969,501 A | | 10/1999 | Glidden et al. |
| 6,005,183 A | | 12/1999 | Akai et al. |
| 6,046,400 A | | 4/2000 | Drummer |
| 6,201,181 B1 | | 3/2001 | Azzam et al. |
| 6,285,572 B1 | * | 9/2001 | Onizuka et al. ............ 363/72 |
| 6,326,764 B1 | * | 12/2001 | Virtudes ............... 320/101 |
| 6,396,239 B1 | * | 5/2002 | Benn et al. ............ 320/101 |
| 6,428,694 B1 | | 8/2002 | Brown |
| 6,476,311 B1 | | 11/2002 | Lee et al. |
| 6,624,350 B2 | | 9/2003 | Nixon et al. |

(Continued)

FOREIGN PATENT DOCUMENTS

JP   63-182722   7/1988

(Continued)

OTHER PUBLICATIONS

Xpower Inverter 3000 Plus Owner's Guide, Dec. 2003 edition, by Xantrex Technology, Inc. Chapter 3, and Appendix A1.

*Primary Examiner*—Matthew V Nguyen
*Assistant Examiner*—Jue Zhang
(74) *Attorney, Agent, or Firm*—Richard C. Litman

(57) ABSTRACT

The portable solar energy system stores electrical energy generated by a solar panel, which is made of an array of photovoltaic cells, in a dc storage battery, and upon demand converts the dc voltage of the battery to an ac output suitable for supplying conventional electrical appliances. The battery is a sealed lead-acid type and may be an Absorbed Glass Mat (AGM) battery. The system includes an energy storage and converting unit, which houses the battery and a dc-to-ac inverter. The inverter converts the stored energy of the battery, supplied at a low dc voltage, into the ac voltage and current required for supplying conventional appliances. A charge controller manages the flow of current from the solar panel to optimize the state of charge of the battery and to maximize the useful life of the battery. Additional circuitry monitors the discharge level of the battery to limit deep discharging.

16 Claims, 4 Drawing Sheets

U.S. PATENT DOCUMENTS

| | | |
|---|---|---|
| 6,737,573 B2 | 5/2004 | Yeh |
| 6,933,627 B2 * | 8/2005 | Wilhelm ..................... 307/66 |
| 7,230,819 B2 * | 6/2007 | Muchow et al. ............ 361/601 |
| 2002/0171391 A1 | 11/2002 | Batts-Gowin |
| 2003/0047209 A1 | 3/2003 | Yanai et al. |
| 2003/0128507 A1 * | 7/2003 | Metcalf ..................... 361/686 |
| 2005/0151508 A1 * | 7/2005 | Cook et al. ................ 320/116 |

FOREIGN PATENT DOCUMENTS

| | | |
|---|---|---|
| JP | 7-321366 | 12/1995 |
| JP | 9-199748 | 7/1997 |
| JP | 2002-238183 | 8/2002 |
| JP | 2002-305886 | 10/2002 |
| JP | 2003-92423 | 3/2003 |
| JP | 2004-88043 | 3/2004 |

* cited by examiner

PORTABLE SOLAR ENERGY SYSTEM

BACKGROUND OF THE INVENTION

1. Field of the Invention

The present invention relates to electrical power generation, and in particular to a portable solar energy system for generating alternating current (ac) and direct current (dc) electrical power.

2. Description of the Related Art

It is frequently desired to provide electrical power to ac appliances through sources, which are independent of a national electric power grid.

In some cases an alternate source of electrical power is desired because there is a need to use power in a place not currently serviced by the grid. This situation may occur in during building construction when electric power service has not been provided to a site. The situation may also occur in countries where the infrastructure for providing electrical power does not exist.

It may also be desirable to provide an alternate source of electrical power in the aftermath of a disaster such as a storm, earthquake or other catastrophe causing damage to the electrical generation and distribution infrastructure.

Many types of electrical power generators have been used to generate power as alternatives to the utility power grid including diesel and gasoline powered generator driven generators. Solar powered systems have been used to generate electrical power and are often seen to be advantageous over fossil fuel powered generators because solar power supplies are quiet, do not generate hydrocarbon emissions, and use a renewal source that can be available when gasoline or diesel fuels are not available.

Conventional solar power systems use an array of solar cells to charge a battery. The battery, in turn, powers an inverter, which coverts the dc power provided by the battery into ac power at the current, voltage and frequency (e.g. 120 volts and 50 or 60 Hz) for powering conventional appliances. However solar cell systems of this type are not without their own problems.

A number of power supplies containing inverters have been developed. The following patents describe representative examples of such devices. Japanese Patent No. 63-182,722, published on Aug. 28, 1988, shows in FIG. 1 a solar system with a solar cell, inverter and a rechargeable battery. Japanese Patent No. 7-321,366, published on Dec. 8, 1995, shows in FIG. 4 a portable array of solar collectors with an inverter for generating ac power. Japanese Patent No. 9-199,748, published on Jul. 31, 1994, describes a non-portable system for generating electric power from solar cells mounted to a structure. Japanese Patent No. 2002-238,183, published on Aug. 23, 2002, describes a portable solar energy system in a trunk style case with an inverter for generating ac electrical power and rechargeable batteries for storing energy.

Japanese Patent No. 2002-305,866, published on Nov. 18, 2002, describes a portable solar energy system in a trunk-style case with an inverter for generating ac electrical power and rechargeable batteries for storing energy with a detachable battery and inverter. Japanese Patent No. 2003-92,423, published on Mar. 28, 2003, describes a portable solar energy system in a trunk-style case with an inverter for generating ac electrical power and rechargeable batteries for storing energy with a detachable battery and inverter and with an expandable solar array. Japanese Patent No. 2004-88,043, published on Mar. 18, 2004, describes a power supply with an array of solar cells, a nickel cadmium battery and an inverter for providing ac power to loads.

None of the above inventions and patents, taken either singly or in combination, is seen to describe the instant invention as claimed. Thus, a portable solar energy system solving the aforementioned problems is desired.

SUMMARY OF THE INVENTION

The portable solar energy system stores electrical energy generated by a solar panel, which is made of an array of photovoltaic cells, in a dc storage battery and upon demand converts the dc voltage of the battery to an ac output suitable for supplying conventional electrical appliances. The battery is a sealed lead acid type and may be an Absorbed Glass Mat (AGM) technology battery.

The system includes an energy storage and converting unit, which houses the battery and a dc-to-ac inverter. The inverter converts the stored energy of the battery, supplied at a low dc voltage, into ac voltage and current required for supplying conventional appliances. The current supplied to the battery is controlled by charge control circuitry, which prevents the discharge of energy from the battery into the cells of the solar panel and which manages the charging current supplied to the battery to optimize the state of charge of the battery and to maximize the useful life of the battery. The charge control circuitry may comprise a fuse and diode. The fuse limits the maximum current provided to the battery by the solar panel to prevent physical changes inside the battery that affect battery life and performance, while the diode prevents discharging of the battery through the cells of the solar panel when the solar panel is not receiving sufficient illumination to charge the battery.

Alternatively, the charge control circuitry can monitor the state of charge of the battery and control the charging current from the solar panel to maintain the battery at a fully charged state without overcharging the battery.

The battery and inverter are provided with a mobile frame for moving the components of the system to a desired location. The frame is provided with wheels and an enclosure is provided to shield the components and circuitry from dust and weather.

During operation the battery's charge state is monitored to prevent discharging the battery to levels that will limit the life expectancy of the battery. The monitoring circuitry provides an audible or visual alarm indication and ultimately shuts down the inverter unit if the battery voltage drops to levels indicating excessive or deep discharge.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
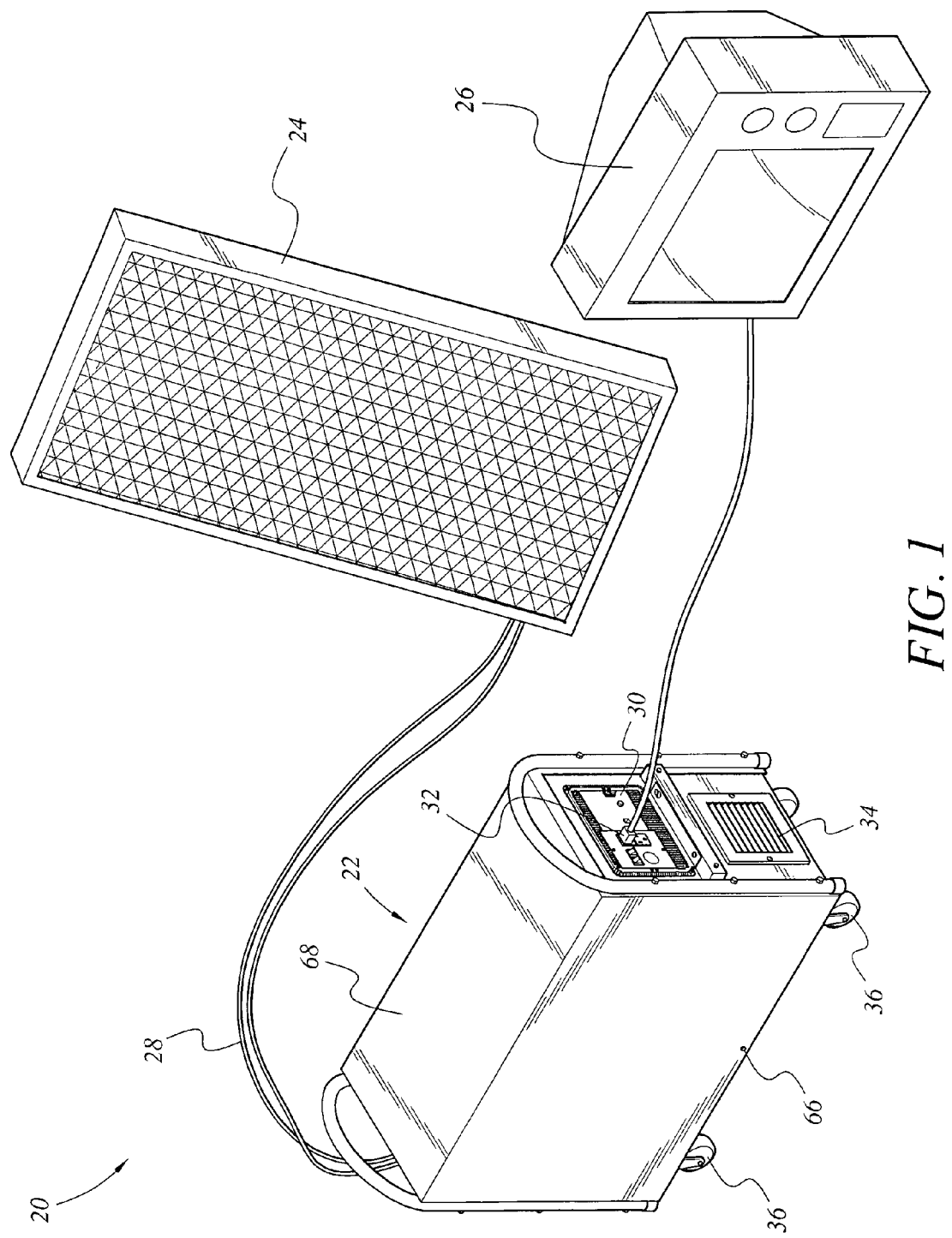
FIG. 1 is an environmental, perspective view of a portable solar energy system according to the present invention.
Figure 2:
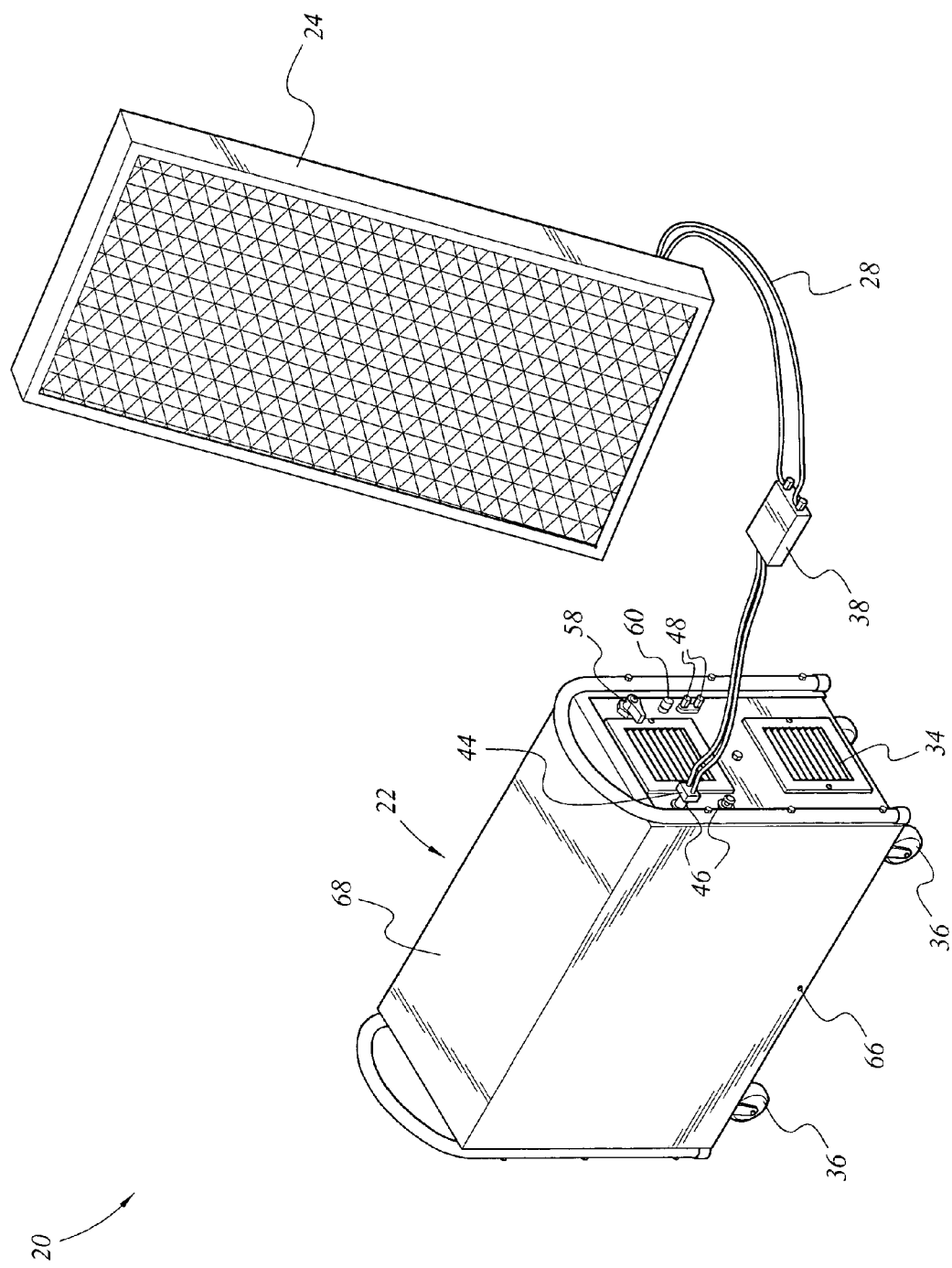
FIG. 2 is a perspective view of the energy storage and conversion unit component of a portable solar energy system according to the present invention.
Figure 3:
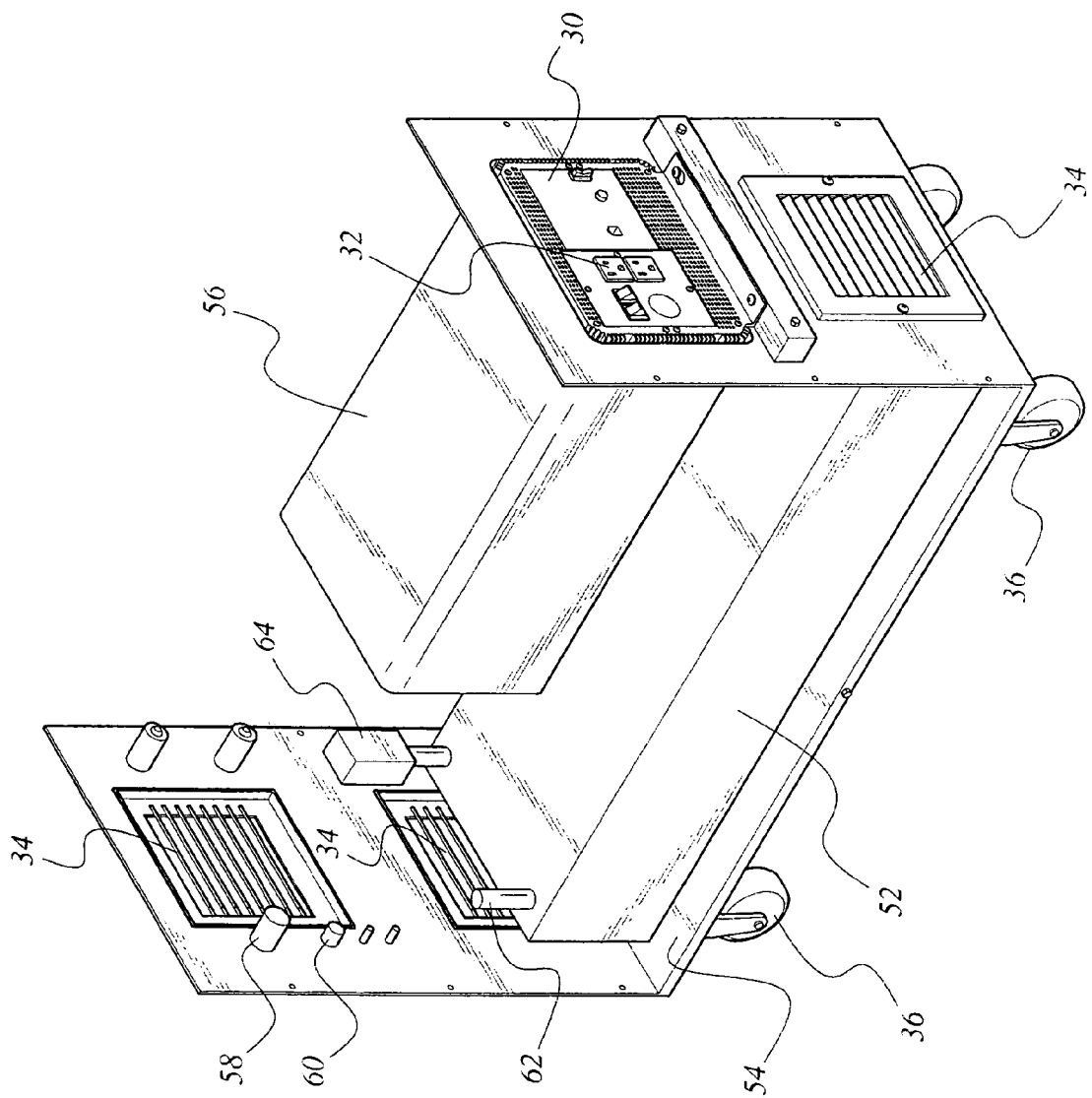
FIG. 3 is a perspective view of the energy storage and conversion unit of FIG. 2 with the housing cover removed.

As shown in FIGS. 1, 2, and 3, the present invention is a portable solar power supply system 20 including a solar panel 24 and an energy storage and conversion unit 22. The system 20 provides power to an appliance 26, such as a television requiring 120-volt, 60 Hz, electric power.

The solar panel 24 comprises an array of solar cells mounted to a frame. Preferably the solar cells are photovoltaic cells, which convert sunlight directly into electrical power. The solar cells are connected in combinations to produce a solar panel 24 capable of generating the required voltage and current for charging a battery 52 located in the energy storage and conversion unit 22. The solar panel 24 is connected to the energy storage and conversion unit 22 through a two-conductor jacketed supply cord 28. The cord terminates in a connector 44 that releasably mates with a connector disposed on a panel of the housing of the energy storage and conversion unit 22.

FIG. 2 shows the details of the connection of the solar panel 24 to the energy storage and conversion unit 22. The cord connector 44 mates with one or more dc power receptacles 46 provided on the energy storage and conversion unit 22. The dc power receptacles 46 are preferably of the type used to provide power to automobile cigarette lighters. The dc power receptacles 46 may also be used to provide 12-volt dc power to such devices as portable music players that can be connected to the cigarette lighter-style receptacles 46 through commonly available adapters. A pair of screw post terminals 48 may be provided connected in a parallel circuit with the dc receptacles. Terminals 48 provide an alternative means of connecting dc loads and charging sources to the energy storage and conversion unit 22.

All of the dc current sourced to, or delivered from, the dc power receptacles 46 and terminals 48 passes through a fuse 60. The charging fuse 60 serves to limit the charging current provided to the battery 52 by dc energy sources, such as the solar panel 24. The fuse 60 also protects the battery 52 from prolonged excessive current draw due to a fault in a dc device connected to the terminals 48 or the dc receptacles 46.

The energy storage and conversion unit 22 comprises a frame 54 supporting the internal components of the energy storage and conversion unit 22. Mounted on the frame is a battery 52 for storing electrical energy, and an inverter 56 for converting dc voltage from the battery 52 and/or a charging source, such as the solar panel 24, into ac electrical power.

In a preferred embodiment of the invention, the battery 52 is of a sealed lead acid construction. Preferably the battery is an absorbed glass mat (AGM) technology battery. AGM batteries release minimal amounts of hydrogen gas during charging and discharging by recombining nearly all of the hydrogen generated with oxygen within the battery. AGM batteries can be designed to be more tolerant of deep discharges in which the battery is heavily depleted of stored energy than conventional wet cell or flooded cell lead-acid batteries. AGM cells are sealed and do not require replenishing of water or electrolyte, further reducing the required maintenance compared to wet cells. Further, AGM batteries do not leak acid when the battery container cracks.

The inverter 56 includes a front panel 30 extending outside of the frame 54 of the energy storage and conversion unit 22. The inverter front panel 30 includes a monitoring section for displaying parameters associated with the energy storage and conversion unit 22, and a plurality of 120-volt receptacles 32 for connecting appliances requiring 120-volt ac power.

The inverter 56 provides a number of protective features. The inverter provides a low battery alarm that produces an audible tone when the battery voltage falls below a first low battery set point. Battery voltage is a measure of the level of charge of the battery, and thus the alarm serves as a warning that the battery 52 is at a low level of charge and should be recharged. The alarm also serves as a warning that continued discharge of the battery 52 will have an adverse effect on battery life.

The inverter 56 includes a shutdown feature that turns off the inverter 56 when the battery voltage drops below a second low battery set point lower than the first set point. This feature prevents excessive discharge of the battery 52 and also insures that the input voltage from the battery 52 is sufficient for the inverter 56 to provide the required voltage and frequency required by appliances plugged into the inverter 56.

The alarm and low voltage shutdown features may alternatively be provided by battery voltage sensing circuitry independent of the inverter 56.

One or more receptacles 32 for plugging in appliances 26 are mounted on the front panel 30 of the inverter 56. The receptacles 32 are of a standard configuration for supplying 120-volt ac appliances. The receptacles may be protected by circuit protectors, which disconnect power to the receptacles 32 if excessive current is drawn by connecting too large a load to the receptacle 32 or by a short circuit or other fault in an appliance or the wiring supplying the appliance.

Accessible from the rear of the energy storage and conversion unit 22 is an inverter switch 58. The inverter switch 58 connects the battery 52 to the input of the inverter 56. The switch 58 is closed in order to supply dc power to the input of the inverter 56. The switch 58 can be opened to isolate the inverter 56 when the energy storage and conversion unit 22 is not in use, or when the battery 52 is being charged. Opening the switch 58 eliminates the small amount of current drawn by the inverter 56 when no loads are being powered, which otherwise would slowly discharge the battery 52.

The dc input to the inverter 56 is protected by a series fuse 64. Fuse 64 is sized to protect the inverter 56 against excessive current draw. The inverter fuse 64 is selected to have a time-current trip curve that allows short-time currents, such as the starting current for a motor driven appliance, to flow without opening the fuse 64, while still providing adequate protection against sustained excessive currents.

A charging control 38 may be provided in the circuitry between the solar panel 24 and the battery 52. The charging control 38 monitors the battery voltage and the output of the solar panel 24, and provides several functions that enhance the operation of the portable solar power supply system 20.

The charging control 38 provides reverse-charging protection, which prevents the battery 52 from discharging through the solar panel 24 when there is insufficient light for illuminating the solar cells. Alternatively this function can be provided by a diode placed in the charging circuit so that reverse currents flowing from the battery 52 to the solar panel 24 are blocked by the diode.

The charging control 38 also manages the charging current to prevent the battery 52 from being overcharged. By monitoring the battery voltage, the charging controller 38 can detect when the battery has reached full charge by detecting when the battery voltage has increased above an upper set point, and then can control the current from the solar panel 24 to provide a float or trickle charge to maintain the battery 52 at optimum levels. When the battery voltage falls below a lower set point, the charging controller 38 can permit the full output of the solar panel 24 to be used to rapidly recharge the battery 52. The voltage set points may be selectable based on the type of battery being used. For example gel cell batteries require different set points than AGM or wet cell technology batteries. In addition, battery voltage is a function of both battery charge state and temperature. The charge controller 38 may be provided with a temperature sensor, which adjusts the set points based on the temperature so that the battery charge can be effectively managed.

Referring to FIGS. 1-3, the frame 54 for the energy storage and conversion unit 22 supports the battery 52 and inverter 56 and the enclosure or housing for the energy storage and conversion unit 22. The frame 54 is supported by a plurality of wheels or casters 36, which allows the energy storage and conversion unit 22 to be easily moved to a location where electrical power is needed. The frame 54 supports an enclosure that houses the inverter 56 and the battery 52 and provides a mounting means for the controls and connections for the energy storage and conversion unit 22. The enclosure is provided with ventilation openings 34 for any hydrogen gas vented by the battery 52 during abnormal conditions to escape, rather than allowing the hydrogen to build up within the enclosure, which might cause a fire or explosion hazard. Under normal conditions, sealed batteries, such as AGM technology batteries, should not release appreciable amounts of hydrogen, since the generated hydrogen is normally recombined within the casing of the battery 52.

Lead-acid batteries can release produce oxygen and hydrogen gasses as a by-product during charging and discharging operations. While sealed lead-acid batteries are designed to recombine the hydrogen and oxygen gasses within the battery enclosure, even sealed lead-acid batteries are designed to vent the hydrogen gas, which may be generated at rates faster than the recombination rate during deep discharges and rapid charging. Because hydrogen gas is an explosion hazard, the enclosure is designed to mediate the affect of an explosion within the energy storage and conversion unit.

As shown in FIGS. 1 and 2, the lower portion of the enclosure 68 is secured to the frame 54 using short sheet metal screws 66. The enclosure 68 is formed of sheet metal. In the event of an explosion within the energy storage and conversion unit 22, the walls of the enclosure 68 would be forced outward, shearing the screws 66, releasing the lower portion of the enclosure 68 from the frame 54. The walls of the enclosure 68 would then deflect the expanding gasses created by the explosion downward and away from personnel standing near the energy storage and conversion unit 22.

The solar panel 24 may be a standalone unit, or, alternatively, the solar panel 24 may be mounted to the frame 54 or enclosure of the energy storage and conversion unit 22.

Figure 4:
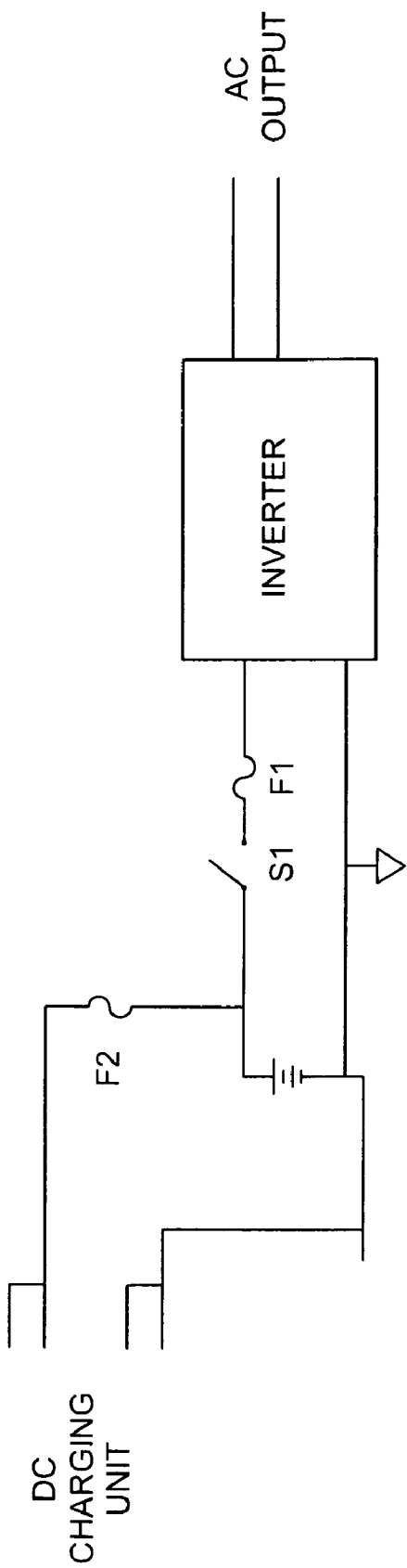
FIG. 4 is a simplified schematic of the energy storage and conversion unit a portable solar energy system according to the present invention.

FIG. 4 shows a simplified schematic of the energy storage and conversion unit 22. Connected between the positive terminal of the battery 52 and the inverter 56 are the inverter fuse F1 and the inverter disconnect switch S1. The inverter switch S1 is mounted on the converter enclosure. The fuse F1 is connected directly to one of the battery terminals. A connection to the positive terminal is shown in the schematic of FIG. 4. Alternatively, the fuse F1 can be located in series with the negative terminal of the battery. The negative terminal of the battery is connected to the frame 54 of the energy storage and conversion unit 22, as shown diagrammatically by the chassis ground symbol in the schematic. The fuse F1 is preferably located inside the enclosure of the energy storage and conversion unit 22, In the dc charging circuit, the fuse F2 is shown connected in series with the positive terminal of the battery. All of the dc current supplied from or supplied to the external dc terminals 48 and the dc receptacles 46 passes through the fuse F2, which limits the maximum charging current of from a charging source, such as the solar panel 24. Limiting the maximum charging rate prevents the generation and release of hydrogen from the battery 52, and prevents physical changes within the battery 52 that can result in a shortened battery life.

In an example embodiment of the invention, the inverter 56 is an XPower 3000 Plus, manufactured by Xantrex. The XPower 3000 Plus inverter is rated for 2500 watts of continuous output power, with a short time surge rating of 3000 watts. The inverter 56 is capable of operating with dc input voltages of 10.5-volts to 15.0-volts dc. The inverter 56 includes a low input voltage alarm at 11.0 volts and a low voltage shutdown at 10.5 volts. The battery 52 may be a size 8D, AGM technology sealed lead-acid battery, such as the Deka model 8A8D. The inverter fuse may be a Bussman ANE or ANL type rated 350 amps. The solar panel 24 may be rated between 100 and 120 watts, such as the KC120-1 from Kyocera, rated at 120 watts when illuminated at 1000 w per square meter. The charge controller 38 may be a SolarPro 21 Amp Charge controller by ICP Global technologies. The SolarPro controller provides reverse current protection, and monitors dc voltage to provide a trickle or float charge when battery voltage is above 14 volts, and allows full charging current when the voltage is below 13 volts. The SolarPro set points are selected based on whether the battery 52 is a gel type or a wet or AGM technology battery. The specific components and ratings described are provided for enablement purposes and do not limit the scope of the invention to the specific components or description.

It is to be understood that the present invention is not limited to the embodiments described above, but encompasses any and all embodiments within the scope of the following claims.

I claim:

1. A portable solar energy system, comprising:
   a solar energy panel having an array of photovoltaic cells for converting light energy into dc electrical energy;
   a charge controller for regulating the flow of dc current from the solar energy panel; and
   an energy storage and conversion unit having:
   a sealed lead-acid battery;
   a dc-to-ac inverter unit electrically connected to the battery for converting energy stored in the battery to ac electrical energy, the inverter having at least one output receptacle;
   a disconnect switch for interrupting dc current between the battery and the inverter;
   circuitry for monitoring and controlling inverter output based on dc voltage supplied to the inverter, wherein the circuitry for monitoring and controlling inverter output comprises:
   an alarm circuit activated when the dc voltage supplied to the inverter drops below a first set point; and
   a shutoff circuit for turning off inverter output when the dc voltage drops below a second set point value; and a frame, the inverter, the battery, and the disconnect switch being mounted on the frame.

2. The portable solar energy system according to claim 1, wherein the battery is an Absorbed Glass Mat (AGM) technology lead-acid battery.

3. The portable solar energy system of claim 1, further comprising a housing mounted on the frame, the housing enclosing the battery and the inverter unit.

4. The portable solar energy system of claim 3, wherein the housing has openings defined therein for venting gases from the battery.

5. The portable solar energy system of claim 1, wherein the charge controller comprises a diode for preventing discharge of the battery through the cells of the solar panel.

6. The portable solar energy system of claim 1, wherein the charge controller comprises circuitry for controlling current flowing from the solar panel to the battery based upon the voltage of the battery.

7. The portable solar energy system of claim 6, wherein said circuitry for controlling current flowing from the solar panel to the battery comprises circuitry for limiting the current to a float charge level when the voltage is above a first voltage set point, and allowing an increased current flow when the battery voltage decreases to a second set point voltage set point.

8. The portable solar energy system of claim 7, wherein the first set point is a function of battery temperature.

9. The portable solar energy system of claim 7, wherein second set point is a function of battery temperature.

10. The portable solar energy system of claim 7, wherein the first set point and the second set point are selectable based on the battery technology.

11. The portable solar energy system of claim 1, wherein the first set point is a function of battery temperature.

12. The portable solar energy system of claim 1, wherein the second set point is a function of battery temperature.

13. The portable solar energy system of claim 1, wherein the first set point and the second set point are selectable based on the battery technology.

14. The portable solar energy system of claim 1, wherein the solar panel is supported by the frame of the energy storage and conversion device.

15. The portable solar energy system of claim 1, further comprising a plurality of wheels attached to said frame for transporting the energy storage and conversion unit.

16. A portable solar energy system, comprising:

a solar energy panel having an array of photovoltaic cells for converting light energy into dc electrical energy;

a charge controller for regulating the flow of dc current from the solar energy panel; and an energy storage and conversion unit having:

an Absorbed Glass Mat (AGM) technology lead-acid battery;

a dc-to-ac inverter unit connected to the battery for converting energy stored in the battery to ac electrical energy, the inverter having at least one output receptacle;

a disconnect switch for interrupting dc current between the battery and the inverter;

circuitry for monitoring and controlling inverter output based on dc voltage supplied to the inverter, wherein the circuitry for monitoring and controlling inverter output comprises:

an alarm circuit activated when the dc voltage supplied to the inverter drops below a first set point; and a shutoff circuit for turning off inverter output when the dc voltage drops below a second set point value; and a frame, the inverter unit, the battery, and the disconnect switch being mounted on the frame.

* * * * *